April 15, 1969  R. A. CARNES ET AL  3,439,255
ENCAPSULATED SEMICONDUCTOR DEVICE INCLUDING A CERAMIC SUBSTRATE
Filed Feb. 1, 1968
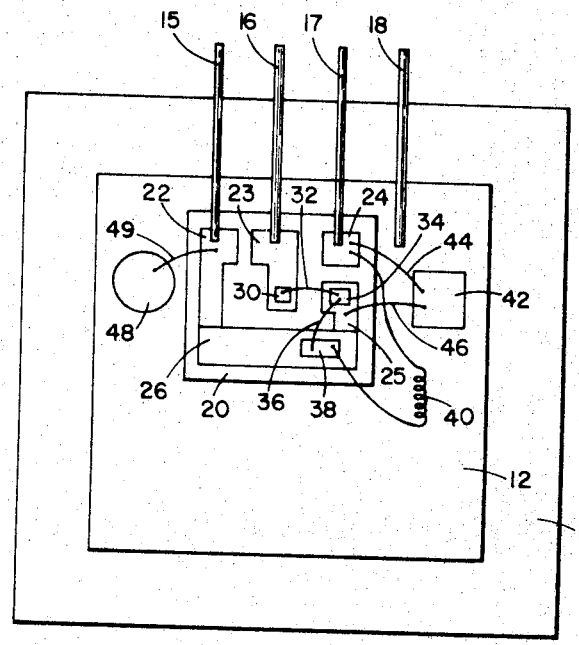
Fig.1
(Actual Size)
Fig.2
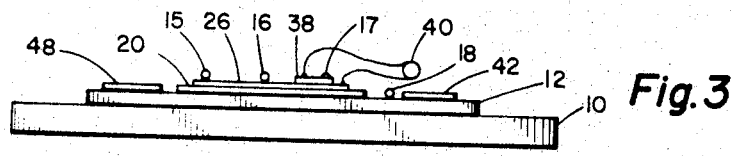
Fig.3
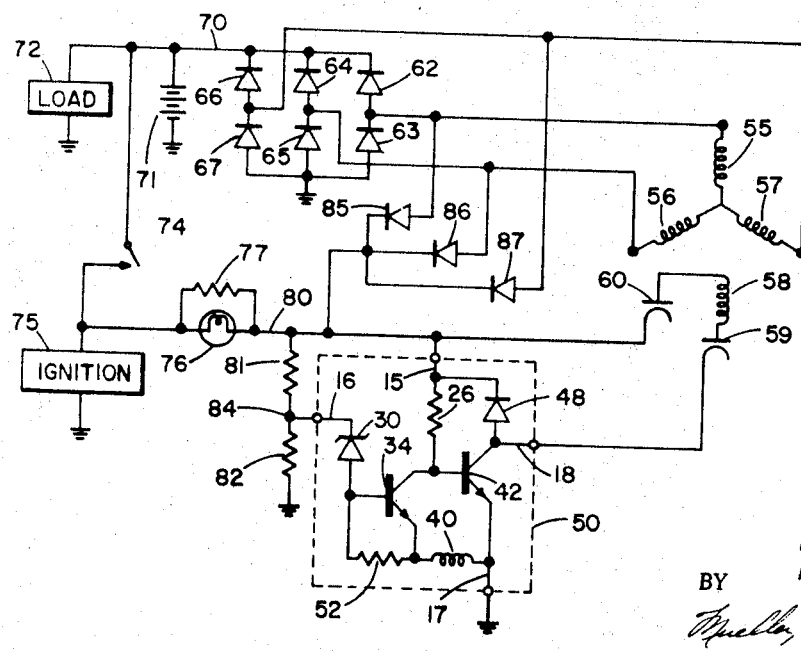
Fig.4
INVENTORS
Douglas W. Taylor
Robert A. Carnes
BY
ATTY'S.

United States Patent Office 3,439,255
Patented Apr. 15, 1969

3,439,255
ENCAPSULATED SEMICONDUCTOR DEVICE INCLUDING A CERAMIC SUBSTRATE
Robert A. Carnes, New Town, Conn., and Douglas W. Taylor, Phoenix, Ariz., assignors to Motorola, Inc., Franklin Park, Ill., a corporation of Illinois
Continuation-in-part of application Ser. No. 511,090, Dec. 2, 1965. This application Feb. 1, 1968, Ser. No. 702,345
Int. Cl. H02p 9/30, 11/04
U.S. Cl. 322—28                     11 Claims

ABSTRACT OF THE DISCLOSURE

Low power semiconductor devices are mounted on a ceramic substrate with deposited conductors. High power semiconductor devices are mounted on a heat sink which also supports the substrate. Wires interconnect the devices. The entire assembly is plastic encapsulated with a few of the wires extending outwardly of the encapsulation.

Related application

This application is a continuation in part of application Ser. No. 511,090, filed Dec. 2, 1965, now abandoned.

The specification

This invention relates generally to voltage regulators for electrical generators, and, more particularly, to a semiconductor voltage regulator provided as a unitized structure.

Voltage regulators are required in automobiles and other systems having a generator for charging a battery, and wherein the generator is driven by the engine of the automobile or some other engine. To provide the desired electrical output, it is necessary that the field of the generator be regulated so that the battery is kept charged to provide the desired capacity and is not overcharged so that the battery is damaged. The charging current required by the battery depends upon the current drawn from the battery by the load, and also on the temperature of the battery. Mechanical vibrating armature-type regulators are in common use, but these are subject to mechanical failure and require substantial maintenance. Semiconductor regulators with Zener diodes for providing the voltage reference, and transistors for controlling the field current of the alternator, are also known. Although such semiconductor regulators are provided in compact form, they have not been suitable for mounting inside the generator or inside the battery.

It is, therefore, an object of the present invention to provide a compact semiconductor circuit in the form of a completely sealed unit.

Another object of the invention is to provide a unitized voltage regulator suitable for mounting in or on a generator or alternator structure, or a battery.

A further object is to provide a unitized voltage regulator structure including silicon semiconductor devices and which is formed as a single composite structure.

A feature of the invention is the provision of a unitized voltage regulator or other semiconductor circuit, including a heat conducting plate with a ceramic substrate thereon and electrical conductor and resistor portions deposited on the substrate, with low power semiconductor elements mounted on the conductor portions and high power semiconductor elements mounted on the heat conducting plate. The low power semiconductor elements may include a Zener diode and a driver transistor connected in a voltage reference circuit, and the high power elements include a power transistor for controlling the field current and a field suppression rectifier.

A further feature of the invention is the provision of a voltage regulator or other circuit, including a copper heat sink mounted on an anodized aluminum mounting plate, with components on the heat sink and leads extending therefrom, and plastic material such as an epoxy resin applied about the components to provide an encapsulated unit from which the leads extend. The mounting plate, heat sink, and encapsulated unit together form a unitized voltage regulator structure.

The invention is illustrated in the drawing wherein:

FIG. 1 shows the unitized voltage regulator of the invention;

FIG. 2 is a plan view of the structure before encapsulation;

FIG. 3 is an elevation view of the structure of FIG. 2; and

FIG. 4 is a circuit diagram and the connection thereof in an alternator system.

In practicing the invention, there is provided a unitized regulator or other circuit structure, including a copper heat sink with semiconductor elements mounted thereon and encapsulated by a plastic material such as epoxy. A plurality of leads extend from the unit for connection of the regulator to the generator or alternator system. A ceramic substrate is provided on the copper heat sink with conductor and resistor portions deposited thereon. Semiconductor dice forming a Zener diode and a driver transistor are position on conductor portions and interconnected to provide a voltage reference circuit. Semiconductor dice forming a power transistor and a rectifier diode are provided directly on the copper heat sink for controlling the field current of the generator. A plurality of leads are connected to the conductor portion and to the heat sink, and the various elements are interconnected so that the power transistor controls the current supplied to the field in accordance with the voltage applied to the reference circuit. The heat sink may be secured to an anodized aluminum mounting plate to be positioned in the generator or in a battery.

FIG. 1 shows the complete voltage regulator unit, including an anodized aluminum mounting plate 10, on which is supported a copper heat sink 12. The oxide layer on mounting plate 10 insulates copper heat sink 12 therefrom. Plastic material 14, which may be an epoxy compound, is provided about the components on the heat sink 12. A plurality of leads 15, 16, 17, and 18 extend from the plastic material 14 for making connections with the circuit of the unitized regulator. The dimensions of the unit, excluding the mounting plate, may be 1" x ⅞" x ½"

FIGS. 2 and 3 show the structure of the regulator before encapsulation. Although FIGS. 2 and 3 show the copper heat sink 12 on the aluminum mounting plate 10, it is to be pointed out that the elements can be mounted on the copper heat sink 12 and encapsulated by the plastic material prior to the mounting of the heat sink on the mounting plate.

The ceramic substrate 20, which may have a thickness of 30 mils, is soldered to the copper heat sink 12. Conductor portions 22, 23, 24, and 25, and resistor 26 are deposited on the substrate. The deposition may be performed by well known "silk screen" techniques wherein material is deposited using a stainless steel mesh to define the areas, and is then fired onto the ceramic substrate. A silver base mixture is used for the conductor portions and cermet is used to form the resistor 26. These are deposited so that the resistor 26 is connected between the conductor portions 22 and 25.

The leads 15, 16, and 17 are connected to the conductor portions 22, 23, and 24, respectively, and lead 18 is connected directly to the copper substrate 12. A semiconductor die 30, forming a Zener diode, is mounted on the conductor 23 by use of soft solder. The cathode of the Zener diode is electrically connected to the conductor portion 23 and the anode is connected to a fine aluminum wire 32 which may be joined to the semi-conductor die by ultrasonic wire bonding. The semiconductor die 34 forms a driver transistor and is soldered to the conductor portion 25. The collector electrode of the transistor is directly electrically connected to the conductor portion 25. The wire 32 is joined to the base of the driver transistor, and another fine wire 36 is joined to the emitter thereof. The wire 36 is connected to a conducting pad 38 formed of metal which is secured by insulating material to the resistor 26. The pad 38 is positioned on the resistor only as a matter of convenience, and there is no electrical connection thereto. Connected between the pad 38 and the conductor portion 24 is an inductor 40.

The output power transistor for the voltage regulator is formed by semiconductor die 42 soldered directly to the copper heat sink 12. The collector electrode of transistor 42 is directly electrically connected to the heat sink, and the emitter electrode of this transistor is connected by wire 44 to the conducting portion 24. The base of the power transistor 42 is connected by conductor 46 to the conducting portion 25. A field suppression diode for the voltage regulator is provided by semiconductor die 48 which is also soldered directly to the copper heat sink. The anode of the rectifier 48 is directly connected to the heat sink, and the cathode is connected by wire 49 to the conductor portion 22. It will be noted that the lead 18, which is connected directly to the copper substrate 12, is connected through the substrate to the collector of transistor 42 and to the anode of the diode 48.

FIG. 4 shows the circuit connecting the elements of the unitized regulator and also the connection of the circuit to an alternator-rectifier generator system. The circuit of the unitized regulator is shown within the dotted lines 50, and the parts are numbered to correspond to the parts as shown in FIGS. 2 and 3. The lead 17, which is connected to the conductor portion 24, is connected to ground. This connects the emitter of transistor 42 and the coil 40 to ground. The lead 16, connected to the conductor portion 23, supplies the sense voltage to the Zener diode 30. The lead 15, connected through conductor portion 22 to resistor 26 and also to the cathode of diode 48, is connected to the voltage supply. The lead 18 forms the output conductor through which the regulated field current is conducted.

Resistor 52 in FIG. 4, which is connected between the base and emitter of transistor 34, is formed integrally with the transistor 34 on the semiconductor die. This resistor can have a value of the order of 1000 ohms. The resistor 26, which is deposited on the substrate 20, has a low value, of the order of 80 to 100 ohms.

In FIG. 4 the alternator is represented by armature windings 55, 56, and 57 which are connected in Y configuration. It is pointed out that the windings could also be connected in delta. A field winding 58 is connected through slip rings 59 and 60 to the leads 15 and 18 of the regulator. The current in the armature winding is rectified by the three phase full wave rectifier, including diodes 62, 63, 64, 65, 66, and 67. A direct current output voltage is therefore developed on conductor 70 with respect to ground. This voltage is applied to charge battery 71 and to supply other loads represented at 72.

The circuit of FIG. 4 is illustrated as an automobile electrical system with switch 74 applying the direct current potential to ignition system 75, one side of which is grounded. The switch 74 when closed also completes a circuit through indicator light 76, bridged by resistor 77, to the conductor 80. Diodes 85, 86 and 87 connect the windings of the alternator to the conductor 80 to supply the output potential thereto when the alternator operates. The diodes 85, 86, and 87 are effectively connected to cooperate with diodes 63, 65, and 67 to provide three phase full wave rectification, so that a direct current voltage is developed on conductor 80 with respect to ground. Therefore, when the alternator is operating, essentially the same voltage appears on conductors 70 and 80, and there is no potential across light 76. Light 76 therefore gives a warning when the alternator is not providing an output voltage which is of the same order of magnitude as the battery voltage.

The voltage sensing circuit for the regulator is connected to conductor 80, and includes resistors 81 and 82. The sensing circuit may include temperature compensating means such as a thermistor and/or a coil to suppress undesired transients. The junction 84 between resistors 81 and 82 is connected to lead 16 of the voltage regulator to supply the sense voltage to the regulator. This voltage causes transistor 34 to conduct when a predetermined value is reached which renders Zener diode 30 conducting. When transistor 34 conducts, transistor 42 is cut off to cut off the supply of current from conductor 80 through field coil 58 and the collector-to-base path of transistor 42 to ground. This reduces the output of the generator so that the voltage on conductor 80 (and conductor 70) is reduced. The diode 48 provides a circuit loop to dissipate the stored energy of field 58 when the current through transistor 42 is interrupted.

The semiconductor devices provided in the unitized regulators are formed of silicon. Because of the tendency of the silicon devices to conduct rapidly, oscillations may be produced in the circuit. The coil 40 acts to prevent such oscillations. Because of the size of the unit and the fact that it is completely encapsulated in epoxy material, the unit is suitable for mounting directly in a generator or in a battery.

We claim:
1. A unitized voltage regulator structure including in combination, a heat and electrical conducting support, an insulating ceramic substrate on said support, conductor means deposited on said substrate, voltage reference means including a Zener diode and a driver transistor on said substrate in electrical connection with said conductor means, output semiconductor means on said support in heat and electrical conducting relation therewith, electrical conducting leads connected to said conductor means and said semiconductor means, and plastic material molded about said components on said support, said plastic material and said support completely enclosing the regulator structure except for portions of said leads which extend from said plastic material.

2. A voltage regulator structure in accordance with claim 1 including an anodized aluminum heat sink on which said support is mounted.

3. A voltage regulator structure in accordance with claim 1 including resistor means deposited on said substrate in conducting relation with said conductor means.

4. A voltage regulator structure in accordance with claim 1 wherein said output semiconductor means includes power transistor.

5. A voltage regulator structure in accordance with claim 1 wherein said output semiconductor means includes a power transistor and a rectifier diode.

6. A voltage regulator structure in accordance with claim 4 wherein said Zener diode, said driver transistor, said power transistor, and said rectifier diode are silicon devices, and said plastic material is an epoxy resin.

7. A unitized semiconductor circuit structure including in combination,
a plate-like heat and electrically conductive support,
an electrically insulative ceramic substrate on said support,
deposited electrically conductive means on said ceramic substrate,
low power dissipating semiconductor means on said substrate remote from said support and in electrical connection with said electrical conductive means,
high-power dissipating semiconductor means on said support means and in thermally and electrically conductive relation therewith, electrically conductive leads connecting said high-power semiconductor means to said electrically conductive means, molded plastic material enclosing all of said means and said substrate and being contiguous with said support, and further electrically conductive leads extending from predetermined ones of said means to outside said plastic material.

8. A structure in accordance with claim 7 wherein said low power semiconductor means includes a Zener diode and a driver transistor.

9. A structure in accordance with claim 8 adapted to operate with a generator having a field coil and wherein said high-power semiconductor means include a power transistor for controlling the current supplied to the field coil of the generator, and a rectifier for providing a path for reverse current through the field coil.

10. A structure in accordance with claim 9 wherein said semiconductor means are silicon devices, and including a resistor connected between the base and emitter electrodes of said driver transistor, and a coil in series with the emitter electrode of said driver transistor, and wherein the plastic material about the components on said support is an epoxy resin.

11. A unitized voltage regulator structure, including in combination, a metallic sheet type heat dissipating member, heat sink means comprising a conductive metal layer, insulating means interposed between said heat sink means and said metallic member for electrically insulating one from the other and such that said heat sink means is supported on said metallic member by said insulating means, ceramic substrate means supported on said metallic member and being in fixed relation thereto, conductor means deposited on said substrate means, voltage reference means, including a Zener diode and a driver transistor on said substrate, in electrical connection with said conductor means, semiconductor means on said heat sink means in heat and electrical conductive relation therewith, electrically conductive leads connected to said conductor means and said semiconductor means, and plastic material enclosing said components on said metallic member, said plastic material completely enclosing the regulator structure except for proportions of said leads which extend from said plastic material and a portion of said metallic member.

References Cited

UNITED STATES PATENTS

| 3,106,665 | 10/1963 | Byles | 322—33 |
| 3,259,805 | 7/1966 | Osopchak et al. | 174—68.5 X |

ORIS L. RADER, *Primary Examiner.*

H. HUBERFELD, *Assistant Examiner.*

U.S. Cl. X.R.

174—68.5; 317—100